United States Patent
Kundur Subramaniyan et al.

(10) Patent No.: US 8,989,681 B2
(45) Date of Patent: Mar. 24, 2015

(54) CALIBRATION OF COMMUNICATION APPARATUS

(75) Inventors: Harish Kundur Subramaniyan, Eindhoven (NL); Ajay Kapoor, Wijchen (NL)

(73) Assignee: NXP, B.V., Eindhoven (NL)

( * ) Notice: Subject to any disclaimer, the term of this patent is extended or adjusted under 35 U.S.C. 154(b) by 1036 days.

(21) Appl. No.: 12/988,812

(22) PCT Filed: Apr. 22, 2009

(86) PCT No.: PCT/IB2009/051652
§ 371 (c)(1),
(2), (4) Date: Oct. 21, 2010

(87) PCT Pub. No.: WO2009/130673
PCT Pub. Date: Oct. 29, 2009

(65) Prior Publication Data
US 2011/0045788 A1    Feb. 24, 2011

(30) Foreign Application Priority Data
Apr. 24, 2008 (EP) .................................... 08103711

(51) Int. Cl.
*H01Q 11/12* (2006.01)
*H04B 1/04* (2006.01)
*H04B 17/00* (2006.01)

(52) U.S. Cl.
CPC ........ *H04B 17/0012* (2013.01); *H04B 17/0052* (2013.01); *H04B 17/0062* (2013.01); *H04B 17/0067* (2013.01)
USPC ...................... 455/126; 455/115.2; 455/114.3

(58) Field of Classification Search
USPC .............. 455/91–129, 552.1, 553.1; 375/296, 375/297
See application file for complete search history.

(56) References Cited

U.S. PATENT DOCUMENTS

| | | | | |
|---|---|---|---|---|
| 5,408,196 A | * | 4/1995 | Sempel et al. | 329/325 |
| 6,118,811 A | | 9/2000 | Narumi et al. | |
| 6,798,843 B1 | * | 9/2004 | Wright et al. | 375/296 |
| 7,181,205 B1 | | 2/2007 | Scott et al. | |
| 7,340,234 B2 | * | 3/2008 | Jun et al. | 455/232.1 |
| 7,613,250 B2 | * | 11/2009 | Sasaki et al. | 375/296 |
| 7,839,314 B2 | * | 11/2010 | Cetin et al. | 341/120 |
| 8,223,881 B2 | * | 7/2012 | Meyer et al. | 375/295 |
| 2005/0239419 A1 | * | 10/2005 | Fudaba et al. | 455/101 |

(Continued)

FOREIGN PATENT DOCUMENTS

| | | |
|---|---|---|
| WO | 97/08840 A2 | 3/1997 |
| WO | 01/05026 A1 | 1/2001 |
| WO | 2006/128075 A1 | 11/2006 |

OTHER PUBLICATIONS

Buck, J., et al. "Discrete-Time Signal Processing," Chapter 3.4 (Discrete-Time Processing of Continuous-Time Signals), pp. 91-114 and 122-130 (Feb. 15, 1999).

(Continued)

*Primary Examiner* — Edward Urban
*Assistant Examiner* — Rui Hu

(57) ABSTRACT

A communication apparatus (200) has a calibration mode in which a signal is passed through circuitry (30, 80) of the apparatus, and a controller (160) measures the response of the circuitry (30, 80) to the signal and adjusts the circuitry (30, 80) to improve performance. The signal used for calibration has a wider bandwidth than the bandwidth of signals used for transmission. The wider bandwidth may be provided by reconfiguring a digital filter (20) from low-pass to high-pass.

15 Claims, 2 Drawing Sheets

(56) References Cited

U.S. PATENT DOCUMENTS

2006/0197538 A1    9/2006  Leinonen et al.
2009/0207896 A1*   8/2009  Behzad ................. 375/221

OTHER PUBLICATIONS

Aggarwal, S., et al. "Functional Requirement Specification for a UWB RF Transceiver," Philips Technical Note PR-TN-2004-00095, 62 pgs. (Jan. 2004).

MBOA / WiMedia Alliance "MultiBand OFDM Physical Layer Specification," Draft Specification—Release 1.1a, 75 pgs. (Jul. 14, 2005).

Leenaerts, D. "Circuit Design for Ultra-Wide Band," 2005 CICC RF Educational Session, Advanced RF: From Devices to Systems, 96 pgs. (2005).

International Search Report and Written Opinion for Int'l. Patent Appln. No. PCT/IB2009/051652 (Aug. 14, 2009).

* cited by examiner

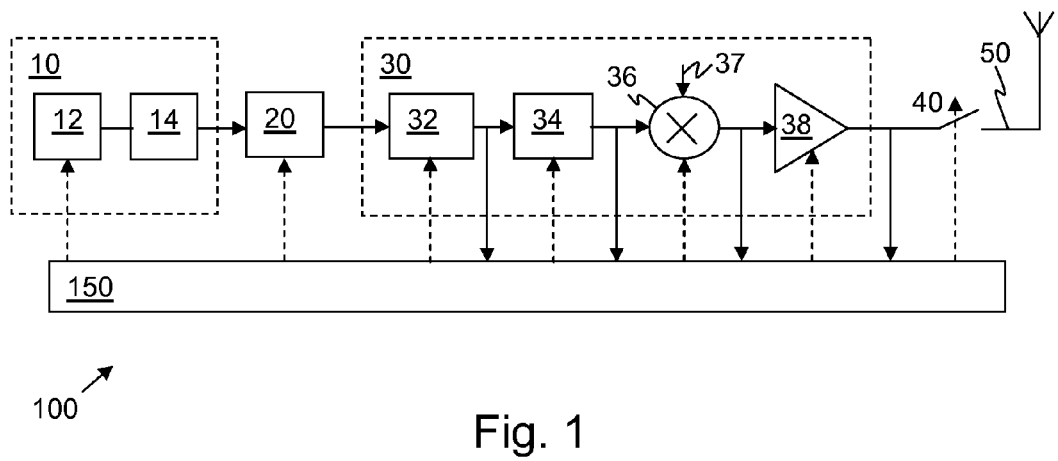
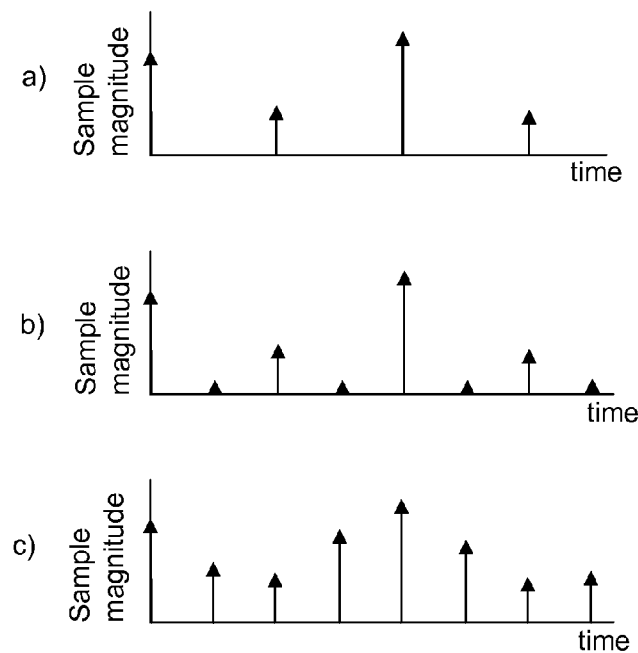
Fig. 1
Fig. 2

CALIBRATION OF COMMUNICATION APPARATUS

FIELD OF THE INVENTION

The invention relates to communication apparatus and to a method of calibrating a communication apparatus. The invention has application in, for example, wireless transmitters and transceivers for cellular telephony, wireless local area networks and ultra wideband applications, and also in transmitters and transceivers for wired communication and optical cables.

BACKGROUND TO THE INVENTION

Due to the decreasing feature size of CMOS transistors, more and more signal processing is being transferred from the analogue domain to the digital domain. Also, high levels of integration have enabled complete systems to be integrated on a single-chip, including both analogue and digital processing, and commonly referred to as System On Chip (SOC). However, although CMOS provides improved transistor performance for digital processing, the performance of CMOS for analogue processing is limited. Some of the problems associated with analogue subsystems are process, voltage and temperature (PVT) variations, non-ideal transistor characteristics such as low-gain, and limited voltage headroom due to lower supply voltages. A large part of a system cost, in terms of power consumption and chip area, is due to addressing these problems in the analogue subsystem of a SOC. This situation can be improved if the traditional analogue designs are combined with digital circuits for calibrating out the imperfections that are present in an analogue circuit, enabling the analogue sub-system requirements to be relaxed and overall system cost to be reduced.

A scheme for the calibration of analogue circuits in a radio transceiver is disclosed in U.S. Pat. No. 7,181,205 B1. In that scheme, amplitude and phase errors of modulation and demodulation in a transceiver are corrected by a self calibration procedure in which a test signal is applied to the baseband input of the transmitter, and the output of the modulator is looped back to the input of the demodulator. The amplitude and phase errors of the resulting signal at the baseband output of the receiver are detected, and the contributions of the transmitter and receiver to the errors are separated and resolved into amplitude and phase components. Adjustments are then made to the amplitude and phase balance in the transmit and receive signal paths to correct the errors.

The present invention seeks to provide improvements in calibration.

SUMMARY OF THE INVENTION

According to a first aspect of the invention there is provided a communication apparatus configurable for first and second modes of operation, the apparatus comprising:
 a signal generator for generating a signal;
 a filter stage coupled to an output of the signal generator and configurable to, in the second mode, permit the passage of energy in at least a higher frequency range than in the first mode;
 wherein in at least the second mode the signal generated by the signal generator comprises energy in the higher frequency range;
 transmitter circuitry coupled to an output of the filter stage for processing a signal delivered by the filter stage to provide a processed signal;
 a coupling stage configurable to, in the first mode, couple the processed signal to an output of the communication apparatus for transmission, and in the second mode, inhibit transmission of the processed signal; and
 a controller for, in at least the second mode, monitoring a response of the transmitter circuitry to the signal delivered by the filter stage and for adjusting a parameter of the transmitter circuitry to obtain a desired response.

According to a second aspect of the invention there is provided a method of calibrating a communication apparatus configurable for first and second modes of operation, the method comprising:
 generating a signal;
 passing the signal through a filter stage permitting, in the second mode, the passage of energy in at least a higher frequency range than in the first mode;
 wherein in at least the second mode the signal generated by the signal generator comprises energy in the higher frequency range;
 processing the signal delivered by the filter stage in transmitter circuitry to provide a processed signal;
 in the first mode, coupling the processed signal to an output of the communication apparatus for transmission, and in the second mode, inhibiting transmission of the processed signal; and
 monitoring, in at least the second mode, a response of the transmitter circuitry to the signal delivered by the filter stage and adjusting a parameter of the transmitter circuitry to obtain a desired response.

The invention, therefore, provides a first mode in which the apparatus transmits, corresponding to normal usage of the apparatus, and a second mode for calibration in which transmission is inhibited. In particular, the signal used for calibration includes energy in a higher frequency range than the signal used for transmission. Transmission is inhibited during calibration to avoid unwanted emissions. The communication apparatus may be a wireless communication apparatus, in which case the output of the communication apparatus is an antenna feed. Alternatively, the communication apparatus may be suitable for communication over wires or optical cables.

This is in contrast to prior calibration schemes in which the baseband signal used for calibration is limited to the normal operating frequency range, such that the response of the system can be measured for that frequency range only. The invention is based on the recognition that the variation of system response within that normal operating frequency range is quite limited and requires a high accuracy of measurement. Moreover, most wireless systems have specifications that prescribe performance in out-of-band frequencies, to ensure the coexistence between different wireless services such as GSM (Global System for Mobile communications), WLAN (Wireless Local Area Network), GPS (Global Positioning System) and Bluetooth™. Similarly, non-wireless communication systems may have constraints on out-of-band frequencies due to frequency multiplexing of different signals on a wire or optical cable. The result of the above factors is a high product cost and complexity.

The invention enables reconfiguration of an apparatus to allow out-of-band signals to be passed through the circuitry that is to be calibrated. Over this wider frequency range, the analogue circuitry exhibits more variation and so the variations are easier to measure. This enables simpler measurement schemes to be employed and enables calibration to be done more precisely.

Optionally, the filter stage may comprise a digital filter having a transfer function configurable to a low pass characteristic in the first mode and to a high pass characteristic in the second mode. This provides a convenient way of configuring the apparatus to pass high frequencies. The same filter that during transmission filters out high frequency energy may be reconfigured to pass high frequencies.

Optionally, the filter stage may be configurable to have a low-pass transfer function having a first bandwidth in the first mode and a low-pass transfer function having a second bandwidth in the second mode, the second bandwidth being wider than in the first bandwidth. This provides an alternative way of configuring the apparatus to pass high frequencies.

Optionally, the filter stage may be configurable to provide filtering in the first mode and no filtering in the second mode. This provides a simple way of configuring the apparatus to pass high frequencies, merely by-passing or omitting the filtering.

Optionally, the signal generated by the signal generator may be a digital signal, and may be oversampled. This is a convenient way of generating energy at high frequencies.

Optionally, the communication apparatus may comprise receiver circuitry, a coupler for coupling the processed signal from the transmitter circuitry to the receiver circuitry, and the controller may be adapted to monitor a response of the receiver circuitry to the processed signal and to adjust a parameter of the receiver circuitry to obtain a desired response. Therefore, the invention is applicable to transceivers.

Optionally, the receiver circuitry may comprise an analogue to digital converter, and the wireless communication apparatus may further comprise a digital filter coupled to an output of the analogue to digital converter. The digital filter may have a transfer function configurable to a low pass characteristic in the first mode and to a high pass characteristic in the second mode. Alternatively, the digital filter may have a low pass transfer function configurable to have a wider bandwidth in the second mode than in the first mode. Alternatively, the digital filter may be configurable to provide filtering in the first mode and no filtering in the second mode. These options enable the response of the receiver circuitry to be monitored in a wider bandwidth during calibration, with the benefit that variations in circuit performance are easier to measure and calibration may be performed more precisely.

The transmitter circuitry may comprise at least one of: a digital to analogue converter, an analogue filter, a frequency up-converter and a power amplifier. The receiver circuitry comprises at least one of: an amplifier, an analogue filter, a frequency downconverter and an analogue to digital converter. The invention is not limited to the calibration of specific analogue circuitry but may be applied to any analogue stages of a transmitter and/or receiver.

BRIEF DESCRIPTION OF THE DRAWINGS

The invention will now be described, by way of example only, with reference to the accompanying drawings, wherein:

FIG. 1 is a block schematic diagram of a transmitter;

FIG. 2, are graphs illustrating oversampling and filtering; and

DETAILED DESCRIPTION OF EMBODIMENTS

Figure 3:
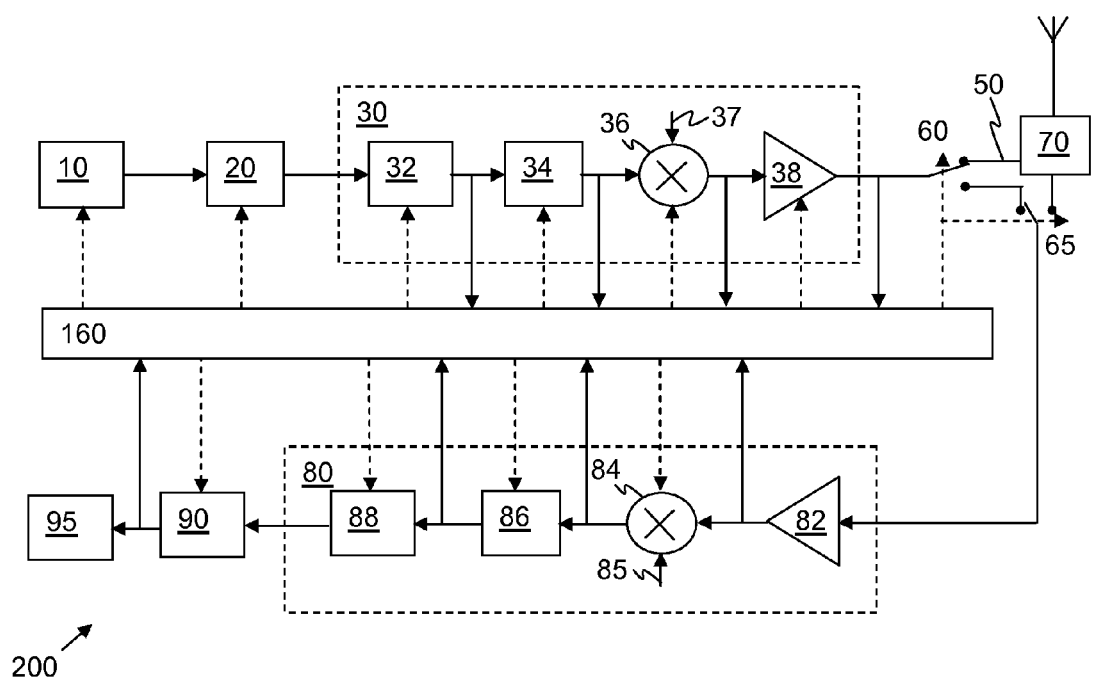
FIG. 3 is a block schematic diagram of a transceiver.

Referring to FIG. 1, there is illustrated a wireless transmitter 100 comprising a controller 150 for selecting either of a transmission mode and a calibration mode. There is a signal generator 10 for generating digital baseband signals during both the transmission mode and the calibration mode. The signal generator 10 comprises a sample generation stage 12 followed by a sample rate conversion stage 14 in which the sample rate is increased. Therefore, the digital signals delivered by the signal generator 10 are oversampled, meaning that the sample rate exceeds twice the bandwidth of the signal being digitised. Oversampling is advantageous but not essential for the operation of the invention. Oversampling enables the use of simple anti-aliasing filtering, and the invention takes advantage of the high frequency content inherently in oversampled signals.

The signal generator may generate the digital baseband signal as in-phase and quadrature-phase components, and these components may be processed through the transmitter along separate paths. However, for clarity separate paths for these components are not illustrated in FIG. 1 as this is not pertinent to the understanding of the invention.

An output of the signal generator 10 is coupled to an input of a filter 20 which is a digital filter, such as a finite impulse response (FIR) filter or infinite impulse response (IIR) filter. The filter 20 is configurable. During the transmission mode it has a low-pass transfer function and reduces the bandwidth of the oversampled digital baseband signal by removing images of the signal introduced by the oversampling stage 14. This filtering process also provides interpolation between sample values, as illustrated in FIG. 2. In FIG. 2, diagrams a), b) and c) each represent a time sequence of digital sample values, with the magnitude of the samples being represented by the height of the samples. Diagram a) represents the samples at the output of the sample generation stage 12, diagram b) represents the samples at the output of the oversampling stage 14 in which the sample rate has been doubled but the added samples have zero amplitude, and diagram c) represents the samples at the output of the filter 20 where the magnitude of the added samples has been determined by the filtering process.

During calibration mode the filter 20 is reconfigured to have a high-pass transfer function. Such a reconfiguration is particularly simple for an FIR filter, as the following analysis demonstrates. The transfer function of an FIR filter of length N+1 is given by $$H(z)=a_0+a_1z^{-1}+a_2z^{-2}+\ldots+a_{N-1}z^{-(N-1)}+a_Nz^{N}$$

where $a_k$, k=0 to N, are the filter coefficients and $z^{-1}$ represents a unit delay. To achieve a linear phase response the filter is made symmetric i.e., $a_i=a_{N-i}$, then the filter response becomes $$H(z) = a_0 + a_1z^{-1} + a_2z^{-2} + \ldots + a_1z^{(N-1)} + a_0z^N$$
$$= z^{-N/2}[a_0(z^{N/2} + z^{-N/2}) + a_1(z^{(N-1)/2} + z^{-(N-1)/2}) + \ldots + a_{N/2}]$$

Transforming H(z) to the frequency domain by replacing z by $e^{j\omega}$, where ω is the frequency, the transfer function becomes $$H(e^{j\omega}) = e^{-j\omega N/2}[a_0(e^{j\omega N/2} + e^{-j\omega N/2}) +$$
$$a_1(e^{j\omega(N-1)/2} + e^{-j\omega(N-1)/2}) + \ldots + a_{N/2}]$$
$$= e^{-j\omega N/2}\left[a_02\cos\left(\frac{\omega N}{2}\right) + a_12\cos\left(\frac{\omega(N-1)}{2}\right) + \ldots + a_{N/2}\right]$$

The term $e^{-j\omega N/2}$ represents the phase, and the amplitude is given by $$|H(e^{j\omega})| = a_0 2\cos\left(\frac{\omega N}{2}\right) + a_1 2\cos\left(\frac{\omega(N-1)}{2}\right) + \ldots + a_{N/2}$$

For a low-pass transfer function, and if $\omega_c$ is the cut-off frequency, for $\omega > \omega_c$, $$|H(e^{j\omega})| \approx 0 \text{ and } a_0 2\cos\left(\frac{\omega N}{2}\right) + a_1 2\cos\left(\frac{\omega(N-1)}{2}\right) + \ldots \approx -a_{N/2}, \text{ and}$$

for $\omega < \omega_c$, $$|H(e^{j\omega})| \approx 1 \text{ and } a_0 2\cos\left(\frac{\omega N}{2}\right) + a_1 2\cos\left(\frac{\omega(N-1)}{2}\right) + \ldots \approx 1 - a_{N/2}.$$

If the co-efficient $a_{N/2}$ is replaced by $a_{N/2}-1$ the transfer function becomes $|H(e^{j\omega})| \approx 0$ for $\omega < \omega_c$ and $|H(e^{j\omega})| \approx 1$ for $\omega > \omega_c$. So the filter 20 can be reconfigured between a low-pass filter and a high-pass filter by merely by changing the constant coefficient $a_{N/2}$. This is particularly easy if $a_{N/2}=0.5$ as is the case for a half-band filter. In this case, only the sign of $a_{N/2}$ needs to be changed, which can be performed simply by replacing an addition by a subtraction in the implementation of the filter. Reconfiguring the filter 20 in this way enables high frequencies above $\omega_c$, which during the transmission mode are suppressed, to be used for the calibration mode with minimal impact on system complexity and cost.

If the filter 20 is an IIR filter, reconfiguration from a low-pass to a high-pass filter may be performed by converting its transfer function $H(e^{j\omega})$ to $(1-H(e^{j\omega}))$. This can be implemented by subtracting the signal at the output of the filter 20 from the signal at the input to the filter 20, with an appropriate delay to compensate for any delay occurring in the filter 20.

Alternatively, instead of reconfiguring the filter 20 between a low-pass transfer function and a high-pass transfer function, it may be reconfigured between low-pass transfer functions having different bandwidths, the bandwidth in the calibration mode being larger than the bandwidth in the transmission mode. As another alternative, the filter 20 may be configurable to provide filtering in the transmission mode, and no filtering in the calibration mode, for example by-passing the filtering or omitting the filtering.

An output of the filter 20 is coupled to an input of transmitter circuitry 30 which includes analogue circuits to be calibrated whilst the transmitter 100 is in the calibration mode. The transmitter circuitry 30 comprises a digital to analogue converter 32 for converting the digital signals received from the filter 20 into the analogue domain. An output of the digital to analogue converter 32 is coupled to an input of an analogue filter 34 that filters the analogue signal. An output of the analogue filter 34 is coupled to a first input of a frequency up-converter 36, which may be a mixer. The frequency up-converter 36 translates the analogue signal received from the analogue filter 34 to a radio frequency (RF) by mixing the analogue signal with a reference signal applied at a second input 37 of the frequency up-converter 36. An output of the frequency up-converter 36 is coupled to an input of a power amplifier 38. An output of the power amplifier delivers the RF signal to the output of the transmitter circuitry 30.

The output of the transmitter circuitry 30 is coupled, by means of a coupling stage 40, such as a switch, to an antenna feed 50 for feeding an antenna. The coupling stage 40 is configurable under the control of the controller 150 to, in the transmission mode, deliver the RF signal to the antenna feed 50 for transmission, and in the calibration mode, to inhibit transmission of the RF. Alternatively, to inhibit transmission of RF during the calibration mode, the signal path may be interrupted at an alternative location in the transmitter 100.

The output of the transmitter circuitry 30 is also coupled to an input of the controller 150. The controller 150 is adapted to, during the calibration mode, assess the quality of the RF signal; for example it may assess the spectral purity of the RF signal by measuring the level of energy outside of a desired frequency range. Alternative or additional quality assessments may be made by the controller 150. In the embodiment of FIG. 1, the signals at the outputs of the digital to analogue converter 32, the analogue filter 34 and the frequency up-converter 36 are coupled to other inputs of the controller 150. Different quality assessments may be made on these different signals. For example, at the output of the digital to analogue converter 32 the linearity of conversion may be assessed, at the output of the analogue filter 34 the matching between in-phase and quadrature-phase filter stages, or DC offsets, or out-of-band suppression may be assessed, and at the output of the frequency up-converter 36 the matching between in-phase and quadrature-phase signal components may be assessed.

Outputs of the controller 150 are coupled to inputs of the elements of the transmitter circuitry 30 and in response to the quality assessments, the controller 150 adjusts the stages of the transmitter circuitry 30 to improve quality. For example, the linearity of the digital to analogue converter 32 may be controlled by adjusting transistor bias voltages, the matching between in-phase and quadrature-phase filter stages of the analogue filter 34 may be controlled by adjusting gains, DC offsets may be removed by cancelling DC levels, and the matching between in-phase and quadrature-phase signal components may be adjusted by controlling gains and bias voltages. As another example, the poles and zeros of the analogue filter 34 may be tuned by means of voltage controlled resistors, capacitors or transconductors, in order to control the filter ripple and cut-off frequency. Any or all of these adjustments may be provided, as required for a specific application. Adjustments made during the calibration mode are maintained during a subsequent transmission mode.

A further output of the controller 150 is coupled to an input of the signal generator 10, enabling different signals to be generated if desired for the transmission mode and calibration mode. For example, calibration may be performed with a stream of identical data bit values, whereas in the transmission mode the data bit values may represent information.

Referring to FIG. 3, there is illustrated a wireless transceiver 200 comprising a transmitter similar the transmitter 100 of FIG. 1. Reference numbers of FIG. 1 have been re-used in FIG. 3 for elements that are identical. Only the differences will be described. In FIG. 3, there is a controller 160 that is adapted to perform the same functions as described above for the controller 150 and additional functions which are described below.

In FIG. 3, the output of the transmitter circuitry 30 is coupled to a coupling stage 60, such as a switch. The path from the coupling stage 60 to the antenna includes a circulator 70 for separating transmitted signals from received signals. An output of the circulator 70 is coupled to an input of a coupler 65, for example a switch, for routing received signals from the antenna to an input of receiver circuitry 80. The receiver circuitry 80 includes analogue circuits that are to be calibrated during the calibration mode. Another input of the coupler 65 is coupled to an output of the coupling stage 60.

The coupling stage 60 is adapted to, under the control of a controller 160, during the transmission mode, deliver a signal from the output of the transmitter circuitry 30 to the antenna feed 50, and during the calibration mode deliver the signal from the output of the transmitter circuitry 30 to the switch 65. The switch 65 is adapted to, under the control of the controller 160, during the calibration mode, deliver to the receiver circuitry 80 the signal provided by the coupling stage 60 from the output of the transmitter circuitry 30, and during the transmission mode, or during a third, reception mode, deliver received signals from the circulator 70 to the receiver circuitry 80. Therefore, during the calibration mode, a signal from the transmitter portion of the transceiver 200 is routed into the receiver portion. The reception mode is a third mode in which the transceiver is neither being calibrated nor is transmitting but is able to process received signals.

The receiver circuitry 80 comprises an amplifier 82 for amplifying received RF signals. An output of the amplifier 82 is coupled to an input of a frequency down-converter 84, which may be a mixer. The frequency down-converter 84 translates a received RF signal to a baseband signal by mixing the RF signal with a reference signal applied at a second input 85 of the frequency down-converter 84. An output of the frequency down-converter 84 is coupled to an input of a filter 86. An output of the filter 86 is coupled to an input of an analogue to digital converter 88 for converting the baseband signal to a digital signal. An output of the analogue to digital converter 88 delivers the digital signal at an output of the receiver circuitry 80. The output of the receiver circuitry 80 is coupled to an input of a digital filter 90, and an output of the digital filter 90 is coupled to an input of a digital processor 95 for processing the digital signals, for example by performing equalisation, demodulation and decoding.

The outputs of the amplifier 82, the frequency down-converter 84 and the filter 86 are coupled to inputs of the controller 160 which assesses the quality of the signals at these respective outputs. Different quality assessments may be made on these different signals. For example, at the output of the amplifier 82 or the filter 86 the DC level may be assessed, at the output of the filter 86 the out-of-band suppression may be assessed, and at the output of the frequency down-converter 84 the matching between in-phase and quadrature-phase signal components may be assessed. Any or all of these quality assessments may be provided, as required for a specific application.

Outputs of the controller 160 are coupled to inputs of the elements of the receiver circuitry 80 and in response to the quality assessments, the controller 160 adjusts the stages of the receiver circuitry 80 to improve quality. For example, DC offsets may be removed by cancelling DC levels, and the matching between in-phase and quadrature-phase signal components may be adjusted by controlling gains and bias voltages. As another example, the poles and zeros of the filter 86 may be tuned by means of voltage controlled resistors, capacitors or transconductors, in order to control the filter ripple and cut-off frequency. Any or all of these adjustments may be provided, as required for a specific application. Adjustments made during the calibration mode are maintained during a subsequent transmission mode or reception mode.

The transfer function of the digital filter 90 may be configurable under the control of the controller 160 to pass higher frequencies during the calibration mode than during transmission or reception mode, for example by reconfiguring the transfer function from low-pass to high-pass, or by reconfiguring the bandwidth of a low-pass transfer function, or by providing no filtering during the calibration mode. In this case, during the calibration mode, the controller 160 may assess the quality of the signal at the output of the digital filter 90, and in response may control the elements of the receiver circuitry 80 as described above.

In the transceiver 200 described above with reference to FIG. 3, the coupling stage 60 inhibits the transmission of RF signals during the calibration mode. Alternatively, to inhibit transmission of RF during the calibration mode, the signal path may be interrupted at an alternative location in the transmitter circuitry 30. In this case in particular, but in any case, a signal from another location in the transmitter circuitry 30 may be coupled under the control of the controller 160 to a desired location in the receiver circuitry 80, according to which elements of the receiver circuitry are required to be calibrated.

The transceiver 200 has been described in which both the transmitter circuitry 30 and the receiver circuitry 80 is calibrated by quality assessment and adjustment. In a further embodiment the quality assessment and adjustment may be performed on only the receiver circuitry 80 and not on the transmitter circuitry 80.

The described elements of the transmitter circuitry 30 and the receiver circuitry 80 are examples only; alternative or additional elements may be present.

So, as described above, calibration of the transmitter circuitry 30 and/or receiver circuitry 80 is performed during a calibration mode in which a signal is passed through the circuitry, the signal used for calibration having a higher frequency spectral content than a signal used for transmission. The higher frequencies of the signal enable more precise calibration and simpler quality assessment schemes. The higher frequencies may be provided by reconfiguring a filter from a low-pass to a high-pass transfer function, by changing the bandwidth of a low pass filter, or by-passing or omitting filtering in the calibration mode. Nevertheless, the invention does not preclude calibration using signals having the normal bandwidth used during transmission, in addition to calibration using higher bandwidth signals as described herein.

The quality of a signal passing through the transmitter circuitry 30 and receiver circuitry 80 may be monitored at various stages. The monitoring points in the embodiments described are examples only, and the signal may be monitored at alternative or additional points.

The quality measures described, such as spectral purity, DC offset, in-phase and quadrature-phase matching, and linearity, are examples only, and other quality measures may be used.

The transmitter circuitry 30 and/or receiver circuitry 80 may be adjusted in response to the monitored signal quality in a variety of ways. The adjustments in the embodiments described are examples, only and alternative or additional adjustments may be made. The adjustments may be iterative, being performed until an optimum, or a desired signal quality is obtained.

Although embodiments of the invention have been described which are each a wireless communication apparatus suitable for communication at radio frequencies, the invention is applicable also to communication apparatus suitable for communication over wires or optical cables, in which case the frequency of transmission and/or reception is not limited to radio frequencies.

From reading the present disclosure, other variations and modifications will be apparent to the skilled person. Such variations and modifications may involve equivalent and other features which are already known in the art of transmitter and receiver design, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A communication apparatus configurable for first and second modes of operation, the apparatus comprising:
    a signal generator for generating a signal;
    a filter stage coupled to an output of the signal generator and configurable to, in the second mode, permit passage of energy in at least a higher frequency range than in the first mode;
    wherein in at least the second mode the signal generated by the signal generator comprises energy in the higher frequency range;
    transmitter circuitry coupled to an output of the filter stage for processing a signal delivered by the filter stage to provide a processed signal;
    a coupling stage configurable to, in the first mode, couple the processed signal to an output of the communication apparatus for transmission, and in the second mode, inhibit transmission of the processed signal through an output device by switching off a connection between the transmitter circuitry and the output device; and
    a controller for, in at least the second mode, monitoring a response of the transmitter circuitry to the signal delivered by the filter stage and for adjusting a parameter of the transmitter circuitry to obtain a desired response, wherein the filter stage comprises a filter having a transfer function configurable to a low pass characteristic in the first mode and to a high pass characteristic in the second mode, wherein the filter is an infinite impulse response (IIR) filter, wherein the IIR filter is configured to have a first transfer function in the first mode and to have a second transfer function in the second mode, and wherein a sum of the first transfer function and the second transfer function is equal to one.

2. A communication apparatus as claimed in claim 1, wherein the filter stage is configurable to have a low-pass transfer function having a first bandwidth in the first mode and a low-pass transfer function having a second bandwidth in the second mode, the second bandwidth being wider than in the first bandwidth.

3. A communication apparatus as claimed in claim 1, wherein the signal generated by the signal generator is a digital signal.

4. A communication apparatus as claimed in claim 3, wherein the digital signal is an oversampled digital signal.

5. A communication apparatus as claimed in claim 1, further comprising:
    a receiver circuitry; and
    a coupler for coupling the processed signal from the transmitter circuitry to the receiver circuitry;
    wherein the controller is adapted to monitor, at least in the second mode, a response of the receiver circuitry to the processed signal and to adjust a parameter of the receiver circuitry to obtain a desired response.

6. A communication apparatus as claimed in claim 5, wherein the receiver circuitry comprises:
    an analogue to digital converter, and
    a digital filter coupled to an output of the analogue to digital converter, and
    wherein the digital filter has a transfer function configurable to a low pass characteristic in the first mode and to a high pass characteristic in the second mode.

7. A communication apparatus as claimed in claim 5, wherein the receiver circuitry comprises:
    an analogue to digital converter, and
    a digital filter coupled to an output of the analogue to digital converter, and
    wherein the digital filter has a low pass transfer function configurable to have a wider bandwidth in the second mode than in the first mode.

8. A communication apparatus as claimed in claim 5, wherein the receiver circuitry comprises:
    an analogue to digital converter, and
    a digital filter coupled to an output of the analogue to digital converter, and
    wherein the digital filter is configurable to provide filtering in the first mode and no filtering in the second mode.

9. The communication apparatus of claim 1, wherein the output device comprises an antenna.

10. The communication apparatus of claim 1, wherein the filter is configured to have a first filter coefficient in the first mode and to have a second filter coefficient the second mode, and wherein the first filter coefficient is different from the second filter coefficient.

11. The communication apparatus of claim 10, wherein the sign of the first filter coefficient is different from the sign of the second filter coefficient.

12. A method of calibrating a communication apparatus configurable for first and second modes of operation, the method comprising:
    generating a signal;
    passing the signal through a filter stage permitting, in the second mode, passage of energy in at least a higher frequency range than in the first mode;
    wherein in at least the second mode the generated signal comprises energy in the higher frequency range;
    processing the signal delivered by the filter stage in transmitter circuitry to provide a processed signal;
    in the first mode, coupling the processed signal to an output of the communication apparatus for transmission, and in the second mode, inhibiting transmission of the processed signal through an output device by switching off a connection between the transmitter circuitry and the output device;
    monitoring, in at least the second mode, a response of the transmitter circuitry to the signal delivered by the filter stage and adjusting a parameter of the transmitter circuitry to obtain a desired response; and
    configuring the filter stage to have a low-pass transfer function in the first mode and a high pass transfer function in the second mode, wherein the filter stage comprises an infinite impulse response (IIR) filter, wherein configuring the filter stage comprises configuring the IIR filter to have a first transfer function in the first mode and to have a second transfer function in the second mode, and wherein a sum of the first transfer function and the second transfer function is equal to one.

13. A method as claimed in claim 12, further comprising configuring the filter stage to have a low-pass transfer function having a first bandwidth in the first mode and a low-pass transfer function having a second bandwidth in the second mode, the second bandwidth being wider than in the first bandwidth.

14. A method as claimed in claim 12, further comprising:
   coupling the processed signal from the transmitter circuitry to receiver circuitry; and
   monitoring, at least in the second mode, a response of the receiver circuitry to the processed signal and adjusting a parameter of the receiver circuitry to obtain a desired response.

15. A method as claimed in claim 14, wherein monitoring a response of the receiver circuitry comprises monitoring a digitized signal at an output of a digital filter, and the method further comprises configuring the digital filter to have a wider bandwidth in the second mode than in the first mode.

* * * * *